May 18, 1965  J. M. R. BROCARD  3,184,185
LIFT MODIFICATION FOR AIRCRAFT
Filed Dec. 17, 1962  2 Sheets-Sheet 2
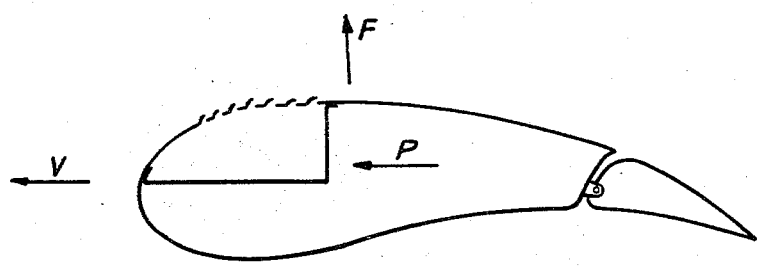
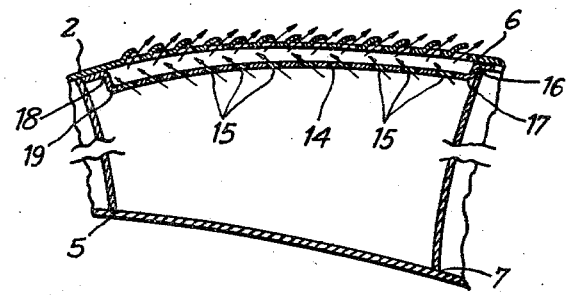

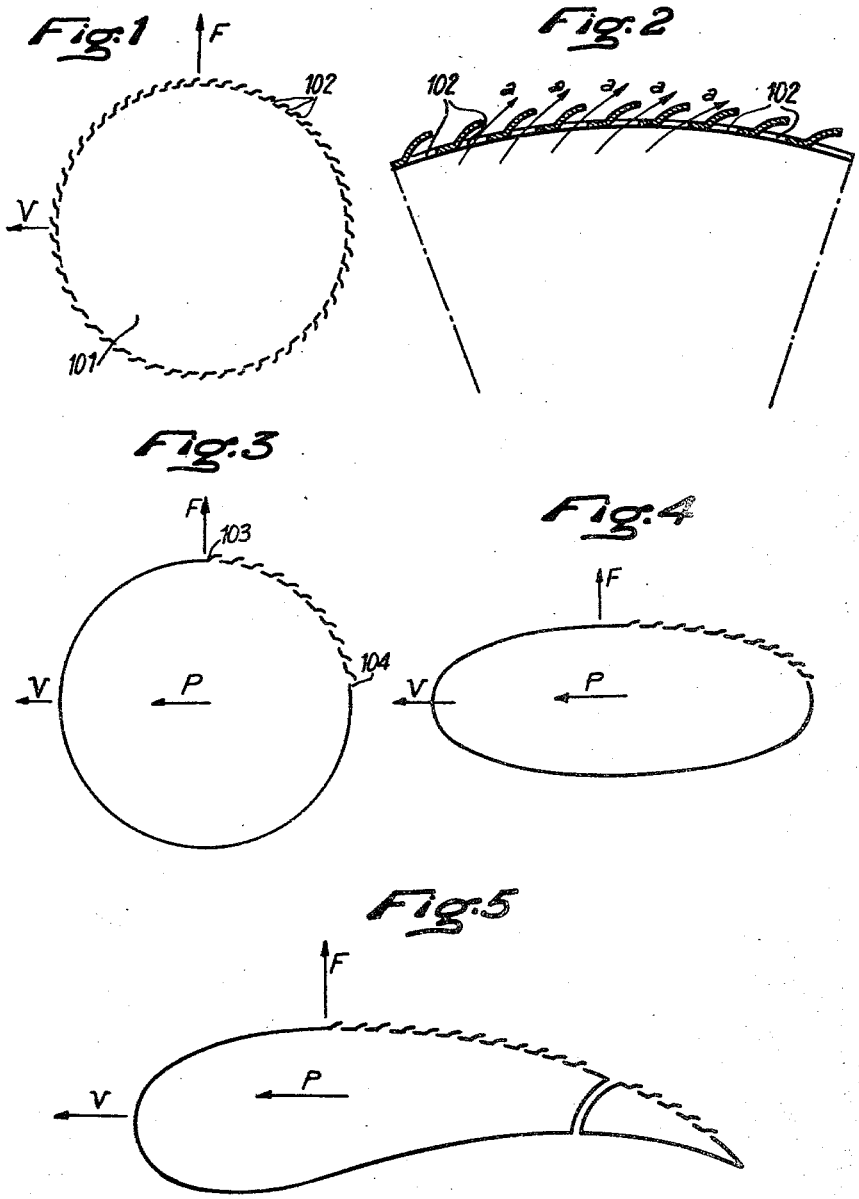

United States Patent Office 3,184,185
Patented May 18, 1965

3,184,185
LIFT MODIFICATION FOR AIRCRAFT
Jean Marie René Brocard, 32 Rue La Fontaine,
Paris, France
Filed Dec. 17, 1962, Ser. No. 245,014
Claims priority, application France, Mar. 16, 1962,
891,423; June 22, 1962, 901,584
2 Claims. (Cl. 244—42)

The present invention relates to the improvement of the flow of air over aircraft in flight or other objects moving in the air, in comparison with the known devices comprising blowing slots.

The invention is applicable, for example, to a cylindrical body the surface of which is entirely perforated, as has been indicated, and which is fixed vertically on a ship. From this body, air is blown. As will be seen, the said body receives a force or thrust perpendicular to the direction of its speed of displacement in the air, and this thrust acts on the ship for moving it as if it were under the action of a sail.

Such a cylindrical body may be fixed in a horizontal position on a vehicle operable on land, water or in the air. In spite of the volume of the body, the resistance of the air may be partially or totally overcome, and the body will receive a vertical thrust or lift. This facilitates the displacement of the vehicle. The body may comprise a container or it may be utilized as a support for publications, etc.

It consists essentially in the blowing of air into a multitude of small orifices closely adjacent one another, substantially in a direction tangential to the air currents due to the movement of the aircraft, but at velocities which all have moments in the same direction in relation to a central point of the aircraft.

One of the objects of the invention is to obtain a hypercirculation with a lower consumption of blown air than in the known devices with blowing slots, and for a lower consumption of energy.

Another object of the invention is, by means of air blown not into slots but into a large number of orifices closely adjacent one another, to obtain a retrenching reaction effect which even cancels or sometimes reverses the drag of the aircraft in flight.

Further objects of the invention will appear in the following description.

It is known that it is usual to improve the flow about a wing profile by processes called blowing, which consist in providing certain regions of the walls of the aircraft wings with slots orientated transversely of the air currents and directed in the direction of these, through which slots air is ejected under high pressure.

Thus against the wall of the wing a supply of energy is obtained, in a layer of air which is given a velocity tangential to the wing and directed in the direction opposite to that of the movement of the aircraft.

This supply of additional air can be apportioned at will, either in order to regulate the boundary layer, or furthermore to increase the value of the flow about the profile (which process is known under the name of hypercirculation).

The present invention consists firstly in utilising for the supply of additional air as defined above, not one or more blowing slots as known, but a blowing surface projecting air under pressure, substantially tangentially to the wing and to the air currents due to the displacement of the aircraft. This surface is obtained for example by covering the wall of the wing with a multitude of orifices closely adjacent one another permitting blowing in directions substantially tangential to the wall of the wing. Thus a blowing wall is obtained.

This manner of operation and this device possess in comparison with the known processes of blowing through slots the advantage of reducing, for equal output, the kinetic energy of the additional air intended for the blowing, by reason of the higher value of the total surface of the air outlet orifices, involving a correlative reduction in the velocity of ejection. It is known that the blowing energy is proportional to the cube of the ejection speed.

Furthermore the high value of the blowing surface produced by the multiple orifices permits of having a surprising effect of improvement of the flow despite this reduction in velocity of ejection of the blowing air, which has been observed in the course of tests on blowing. It is known that a blow slot has the purpose of placing a boundary layer on a wing. This action has little effect adjacent the slot opening and over a short distance of a few centimeters or decimeters downstream from the slot. On the contrary, it is understood that in utilizing blown air in the vicinity of the maximum of the depression of air on the upper surface of the wings, the boundary air is superposed substantially upstream of the blown air and on substantially the entire wing downstream. This is therefore an important action superior to that which could be expected by the juxtaposition of a plurality of blowing slots, for example, whereas the actual constructions imply that these slots be separated necessarily by appreciable intervals, as will be seen from the patents which have been utilized to disclose successive slots.

This is an important unforeseen effect.

This manner of operation and this device thus permit, with energy considerably more reduced than in the case of blowing through slots, of controlling the boundary layer and of creating very improved hypercirculation.

In this latter case, not only a hypersustaining action is created, but a reaction effect is created which recovers itself from the drag, sometimes even to the point of cancelling and even reversing the latter for a value of the blowing pressure which experience permits of determining.

The invention will be further described hereinafter by reference to examples of its application which are illustrated in the accompanying drawings, wherein:

FIGURE 1 shows in diagrammatic section a cylinder moving in air at a velocity V perpendicular to its axis.

FIGURE 2 is a partial section, on a larger scale than FIGURE 1, of which in fact it is a partial enlargement.

FIGURE 3 shows in diagrammatic fashion a cylinder similar to that in FIGURE 1 but equipped with a blowing area extending only over a part of the surface of the cylinder between the generatrices 103 and 104.

FIGURE 4 is a diagrammatic section similar to FIGURE 3 but of oval or elliptical section.

FIGURE 5 shows in diagrammatic fashion the application of the invention to a profiled aircraft wing and its trailing edge aileron.

FIGURE 6 is a view similar to that of FIGURE 5 showing a modification.

FIGURE 7 is a partial sectional view of FIGURE 2 with an improvement embodied therein.

In the drawings, referring firstly to FIGURE 1, the cylinder 101 illustrated in section is subjected internally to a pressure higher than the external pressure. The walls of this cylinder are pierced with holes 102 closely adjacent one another, as may be seen from FIGURE 2 over a partial section, on a larger scale than in FIGURE 1, giving to the escaping air currents $a$ a direction close to a tangent of the cylinder. In these figures the tangential direction is hardly apparent, for simple reasons of clarity of the drawing. A flow appears which produces a lifting force F normal to the wind.

FIGURE 3 shows a cylinder similar to the previous one but equipped with a blowing area prevailing over a part of the surface of the cylinder, between the generatrices 103 and 104. In this case a propulsion component P also appears. It is then noted that the projection of the moving quantities of the ejected air currents is directed in the direction opposite to the movement.

FIGURE 4 shows the application of the blowing surfaces to a cylinder of oval section, equipped partially with a blowing surface similar to that in FIGURE 2.

FIGURE 5 shows the application of the invention to a profiled wing and possibly to its trailing edge aileron. In these two latter cases, the air blowing permits also of obtaining lifting components F and propulsion components P.

FIGURE 6 discloses a modification of FIGURE 5, but the blowing wall is located at the region of the air where it is known there is produced on the usual wing the maximum depression, that is to say, within the third forepart of the upper surface of the wing. In this case, blowing tests have shown that on models of existing airplanes the vertical component $C^z$ of the aerodynamic coefficient increases more than one fifth by the utilization of a device according to the invention, compared to a classic device and considered as particularly efficient up to now comprising a suction slot upstream followed by a blowing slot which is more downstream.

One form of embodiment of the blowing surface consists in using a perforated sheet known in commerce under the name of "expanded metal," the axis of symmetry of the orifices being in principle disposed in the direction of displacement.

The present invention can of course be used in combination with known hypersustaining processes or in addition to these.

Another improvement of the blowing area device is represented in FIGURE 7 and permits a correct distribution of the air through the orifices of the blowing area. It is in fact known that if the air is passed purely and simply into the closed space having as section the curvilinear quadrangle 2–6–7–5, this air tends to escape in greater quantity in the wing parts remote from the air intake. Now blowing tests, after possible prior calculations, permit of knowing the distribution of the blown air which corresponds to the optimum flow around the wing and to the optimum lift (constant velocity, or constant air output per unit of area, or air output variable along the wing, etc.).

In order to obtain this result, as shown in FIGURE 7 there are disposed substantially parallel with the blowing area, panels 14 perforated with many single holes 15, of sizes and density distributed in accordance with a law determined by calculation or at least determined empirically and checked by blower tests. The air reaches the blowing area orifices only through the holes 15. The space between the blowing area and the panel 14 is of course limited laterally, as air-tightly as possible, at 16–17 and 18–19.

I claim:

1. An aircraft, the external surface of which is provided, at least over a part called the blowing area, with a large number of orifices closely adjacent to one another forming nozzles whose direction is substantially tangential at each point to this blowing area in transverse and practically vertical planes, parallel to the direction of movement, through which orifices air taken from the interior of the said object is blown, the exit velocities of this blown air all having a moment in the same direction in relation to a central point of the said object, in each aforementioned transverse plane, wherein an internal panel parallel to the blowing area separates a volume of the general flow of blowing air and is equipped with multiple holes distributed to effect the outlet of the air in accordance with a law given in advance and tested by blowing experiments.

2. An aircraft according to claim 1, in which said orifices are provided over the region of the maximum depression of the air over the upper surface of a wing.

References Cited by the Examiner
UNITED STATES PATENTS

| | | |
|---|---|---|
| 1,501,248 | 7/24 | Strong. |
| 1,877,474 | 9/32 | Burkart. |
| 2,568,812 | 9/51 | Lee _____ 244—42 X |
| 2,873,931 | 2/59 | Fleischmann _____ 244—42 |
| 2,940,690 | 6/60 | Wood _____ 244—42 X |
| 2,959,377 | 11/60 | Kaplan _____ 244—42 X |
| 2,973,922 | 3/61 | Davidson et al. _____ 244—42 |
| 3,062,483 | 11/62 | Davidson _____ 244—42 |
| 3,128,063 | 4/64 | Kaplan _____ 244—42 |
| 3,128,973 | 4/64 | Dannenberg _____ 244—42 |

FOREIGN PATENTS

| | | |
|---|---|---|
| 696,254 | 9/40 | Germany. |
| 707,054 | 6/41 | Germany. |

MILTON BUCHLER, *Primary Examiner.*